United States Patent [19]

Noso et al.

[11] Patent Number: 4,610,023
[45] Date of Patent: Sep. 2, 1986

[54] SPEECH RECOGNITION SYSTEM AND METHOD FOR VARIABLE NOISE ENVIRONMENT

[75] Inventors: Kazunori Noso, Yokosuka; Norimasa Kishi, Yokohama; Toru Futami, Yokosuka, all of Japan

[73] Assignee: Nissan Motor Company, Limited, Japan

[21] Appl. No.: 456,326

[22] Filed: Jan. 6, 1983

[30] Foreign Application Priority Data

Jun. 4, 1982 [JP] Japan ..................... 57-94883

[51] Int. Cl.⁴ ............................................. G10L 5/00
[52] U.S. Cl. ................................................... 381/43
[58] Field of Search ..................... 381/41–47, 381/110; 364/513, 513.5

[56] References Cited

U.S. PATENT DOCUMENTS

| | | | |
|---|---|---|---|
| 3,812,291 | 5/1974 | Brodes et al. | 381/43 |
| 4,239,936 | 12/1980 | Sakoe | 381/43 |
| 4,331,837 | 5/1982 | Soumagne | 381/46 |
| 4,336,421 | 6/1982 | Welch et al. | 381/43 |

*Primary Examiner*—E. S. Matt Kemeny
*Attorney, Agent, or Firm*—Lowe, Price, Leblanc, Becker & Shur

[57] ABSTRACT

An automotive vehicle speech recognition system sets a recording-mode reference threshold level to be lower than a recognition-mode reference threshold level. Therefore, a spoken instruction supplied to the system in a low voice while the vehicle is parked in a quiet place during a record mode can be correlated with an instruction uttered in a loud voice during a recognition mode while the vehicle is running in a noisy environment. During the record and recognition modes reference threshold signals derived by smoothing a spoken instruction are multiplied by two different factors such that the reference threshold in the recognition mode has a greater multiplication factor than the reference threshold in the record mode. While the driver is uttering a command a first smoothed version of the utterance power spectrum is compared with a fixed reference threshold level, set to the value of a second smoothed version of the utterance power spectrum at the time the utterance began. While no command is being uttered the reference threshold varies in accordance with the second smoothed version. The first smoothed version includes higher frequency components than the second smoothed version.

20 Claims, 13 Drawing Figures

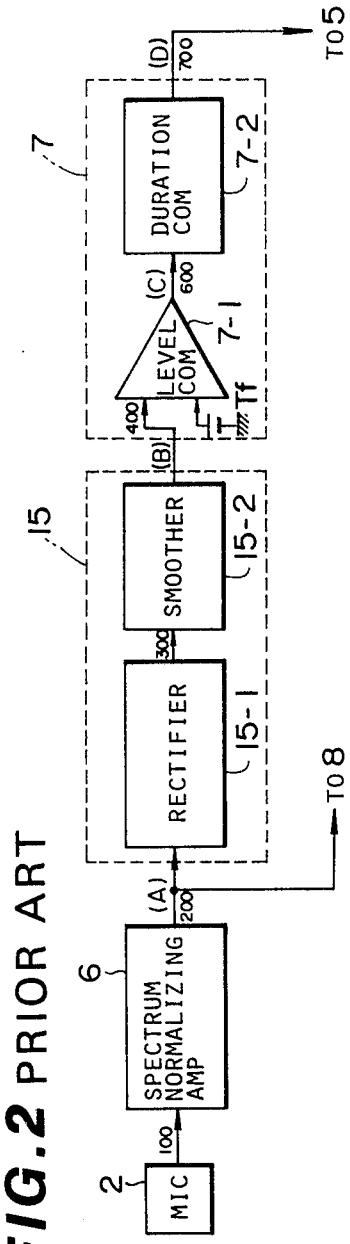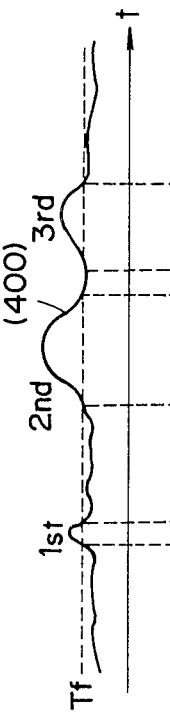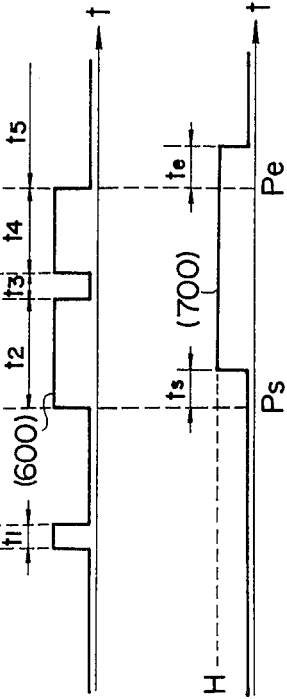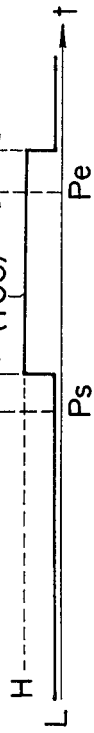
FIG. 2 PRIOR ART
FIG. 3(A) PRIOR ART
FIG. 3(B) PRIOR ART
FIG. 3(C) PRIOR ART
FIG. 3(D) PRIOR ART

SPEECH RECOGNITION SYSTEM AND METHOD FOR VARIABLE NOISE ENVIRONMENT

BACKGROUND OF THE INVENTION

1. Field of the Invention

The present invention relates generally to a speech recognition system for an automotive vehicle, and more particularly to a speech recognition system by which driver's spoken instructions can reliably be recorded or recognized even as noise fluctuates within the passenger compartment.

2. Description of the Prior Art

There is a well-known speech recognizer which can activate various actuators in response to human spoken instructions. When this speech recognizer is mounted on a vehicle, the headlight, for instance, can be turned on or off in response to spoken instructions such as "Headlight on" or "Headlight off". Such a speech recognizer usually can recognize various spoken instructions in order to control various actuators; however, there are some problems involved in applying this system to an automotive vehicle.

Usually, the speech recognizer is used in a relatively quiet environment; however, the speech recognizer system for an automotive vehicle is usually used within a relatively noisy passenger compartment subjected to wide changes in noise level. Therefore, one of the major problems is how to cope with erroneous spoken phrase recognitions caused by fluctuating engine noise within the passenger compartment.

In conventional systems a spoken instruction is distinguished from noise by providing a voice detector in the speech recognizer. The start and the end of a spoken instruction are determined by the recognizer respectively detecting whether the magnitude of a spoken instruction signal exceeds a predetermined reference threshold voltage level for a predetermined period of time and whether the magnitude of the spoken instruction signal drops below the predetermined reference threshold voltage level for another predetermined period of time.

In the prior-art speech recognizer, however, since the reference threshold voltage level is fixed, when noise level exceeds the reference threshold voltage for a long time, for instance when the vehicle is running within a tunnel, the voice detector can erroneously consider this state to represent the beginning of a spoken instruction. In other words, the prior-art speech recognizer is prone to erroneous recognition due to intense noise within the passenger compartment.

A driver has a tendency to utter a spoken instruction in a loud voice in a noisy place but in a low voice in a quiet place. In the prior-art speech recognizer, the reference threshold voltage level in recognition mode is fixed at a relatively high level for preventing erroneous recognition due to noise and the threshold level in recording mode is fixed at almost the same high level as in recognition mode. To enable the prior art system to operate properly the driver should utter a spoken instruction loudly in recording mode. However, this is contrary to the driver's inclination to speak quietly because the automobile is usually in a quiet environment while instructions are being recorded. When a spoken instruction is uttered into the microphone in a relatively loud voice, correspoding digital time-series matrix-pattern data (explained later) tend to be distorted. This results in a difference between the recording and recognition mode patterns, making it difficult to reliably recognize a spoken instruction.

A more detailed description of a typical prior-art speech recognizer and a typical prior-art voice detector will be made with reference to the attached drawings in conjunction with the present invention under DETAILED DESCRIPTION OF THE PREFERRED EMBODIMENTS.

SUMMARY OF THE INVENTION

With these problems in mind therefore, it is the primary object of the present invention to provide a speech recognition system for an automotive vehicle which can reliably record and recognize a spoken instruction on the basis of two different reference threshold levels suitably determined in both recording mode and in recognition mode, independently; that is, which can reliably prevent erroneous recognition of spoken instructions due to noise within the passenger compartment.

To achieve the above-mentioned object, a voice detecting means in the speech recognition system for an automotive vehicle according to the present invention sets the reference threshold voltage level in recording mode to be lower than that in recognition mode. Therefore, even if the driver utters a spoken instruction in a low voice when the vehicle is parked in a quiet place, the instruction is reliably recorded. On the other hand, even if noise within the passenger compartment is intense, as when the vehicle is running on a noisy city street, the instruction is reliably supplied to the system, providing that the driver utters a spoken instruction in a relatively loud voice.

The speech recognition system for an automotive vehicle according to the present invention comprises, in particular, an analog switch for switching a smoothed spoken instruction signal (reference threshold level) to first and second terminals while the system is respectively in a recording-mode and a recognition-mode. The terminals are respectively coupled to an input of a recording-mode multiplier and a recognition-mode multiplier (arranged so the multiplication rate of the recording mode multiplier is smaller than that of the recognition multiplier). Further, when the system according to the present invention is incorporated within a microcomputer, a program control first determines whether the system is in the recording mode or in the recognition mode and independently calculates a recording-mode reference threshold level and a recognition-mode reference threshold level, on the basis of two different expressions in such a way that the recording-mode level is lower than the recognition-mode level.

In accordance with a further aspect of the invention there is provided a speech recognition system and method capable of operating in environments having different background noise levels. The system has previously recorded therein signals representing a voice power spectrum of speech utterances to be recognized thereby. In the system and method there are derived first and second signals respectively representing power in two different low pass spectra as derived in response to speech uttered for recognition by the system in the presence of background noise in the environment where the utterance occurs. The first signal includes frequency components higher than those of the second signal. A signal comparator derives (a) a first signal level indicating that an utterance is occurring when a function of the magnitude associated with the first signal exceeds the magnitude of the second signal for more than predetermined interval and (b) a second signal level indicating that an utterance is no longer occurring when the function of the magnitude associated with the first signal is less than the magnitude of the second signal for a set interval. The function f, is of the form $$f = \alpha P + \beta$$

where $\alpha$ = a first predetermined non-zero constant $\beta$ = a second predetermined constant that may be zero P = a function of the power spectrum of the utterance and the background noise such that P is a replica of the utterance and background noise power spectrum while the second signal level is derived.

P is constant value commensurate with the power spectrum of the utterance and background noise at the time the first signal is initially derived. The constant value of P is derived throughout the interval of the first signal level. The signals representing the voice power spectrum of the utterance are compared with the recorded voice power spectrum for the several different utterances while the first signal level is derived. The voice power spectrum comparison is disabled while the second signal level is derived.

BRIEF DESCRIPTION OF THE DRAWINGS

The features and advantages of the speech recognition system for an automotive vehicle according to the present invention will be more clearly appreciated from the following description taken in conjunction with the accompanying drawings in which like reference numerals designate corresponding elements or sections throughout the drawings and in which;

FIG. 2 is a schematic block diagram of a detailed portion of the voice detecting means of the prior-art speech recognizer shown in FIG. 1;

FIG. 3(A) is a graphical representation of the waveforms of a spoken instruction signal including noise as measured at point (A) in FIG. 2;

FIG. 3(B) is a graphical representation of the waveforms of the spoken instruction signal including noise and a reference threshold voltage level as measured at point (B) in FIG. 2;

FIG. 3(C) is a graphical representation of the waveform of the spoken instruction pulse signal as measured at point (C) in FIG. 2;

FIG. 3(D) is a graphical representation of the waveform of the spoken instruction start/end signal as measured at point (D) in FIG. 2;

DETAILED DESCRIPTION OF THE PREFERRED EMBODIMENTS

Figure 1:
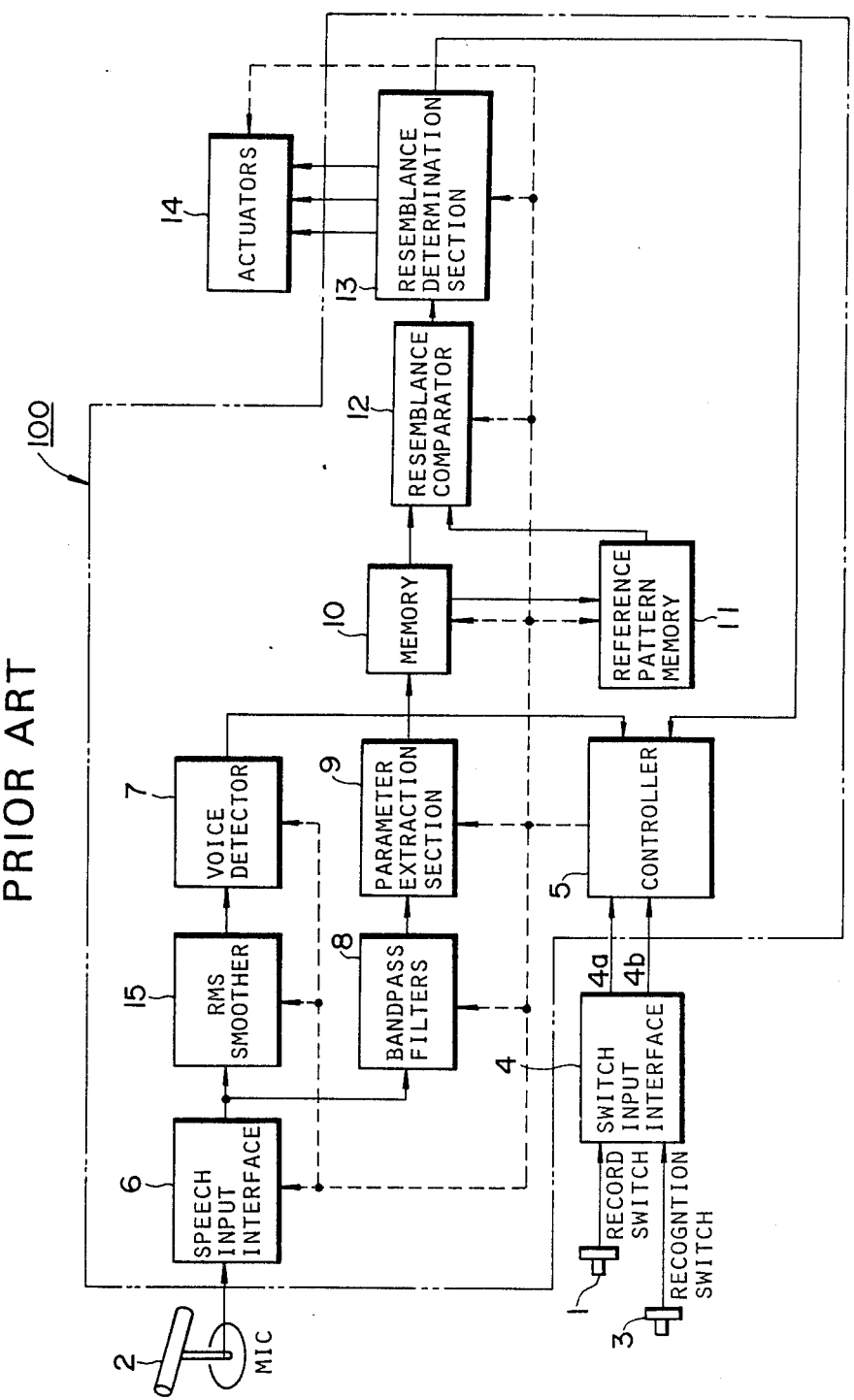
FIG. 1 is a schematic block diagram of a typical prior-art speech recognizer for assistance in describing the operations thereof.

To facilitate understanding of the present invention, brief reference is made to the principle or operation of a typical prior-art speech recognizer, with reference to FIG. 1.

FIG. 1 is a schematic block diagram of a typical speech recognizer 100. To use the speech recognizer, the user must first record a plurality of predetermined spoken instructions. Specifically, in this spoken instruction recording mode (reference mode), the user first depresses a record switch 1 disposed near the user. When the record switch 1 is depressed, a switch input interface 4 detects the depression of the record switch 2 and supplies a signal to a controller 5 via a wire 4a. In response to this signal, the controller 5 supplies a recording mode command signal to other sections in order to preset the entire speech recognizer to the recording mode. In the spoken instruction recording mode, when the user utters into microphone 2 a phrase to be used as a spoken instruction, such as "open doors", the spoken phrase is transduced by the microphone into a corresponding electric signal that is amplified through a speech input interface 6 including mainly a spectrum-normalizing amplifier; the amplifier output is smoothed by root-mean-square (RMS) smoother 15 including a rectifier and a smoother, and finally coupled to a voice detector 7.

The spectrum-normalizing amplifier in interface 6 amplifies the input at different gain levels at different frequencies, to adjust the naturally frequency-dependent human speech power spectrum to a nearly flat power spectrum. Voice detector 7 detects whether or not the magnitude of the spoken phrase signal exceeds a predetermined level for a predetermined period of time (150 to 250 ms) to recognize the start of the spoken phrase input signal and whether or not the magnitude of the signal drops below a predetermined level for a predetermined period of time (about 300 ms) to recognize the end of the signal. Upon detection of the start of the signal, voice detector 7 supplies another recording mode command signal to the controller 5. In response to this command signal, the controller 5 activates a group of bandpass filters 8, so that the spoken phrase signal from the microphone 2 is divided into a number of predetermined frequency bands. The frequency-divided spoken phrase signals derived from filters 8 are supplied to parameter extraction section 9 which squares or rectifies them to derive the voice power spectrum across the frequency bands and then converts them into corresponding digital time-series matrix-phonetic pattern data (explained later). These data are then stored in a memory unit 10. In this case, however, since the speech recognizer is set to the spoken instruction recording mode by the depression of the record switch 1, the time-series matrix-phonetic pattern data are transferred to a reference pattern memory unit 11 and stored there as reference data for use in recognizing the speech instructions.

After having recorded the reference spoken instructions, the user can supply speech instructions, such as "open doors", to the speech recognizer through the microphone 2 while depressing a recognition switch 3.

When recognition switch 3 is depressed, the switch input interface 4 detects that recognition switch 3 is depressed and supplies a signal to the controller 5 via a wire 4b. In response to this signal, the controller 5 supplies a recognition mode command signal to other sections to preset the entire speech recognizer to the recognition mode. In this spoken phrase recognition mode, when the user says an instruction phrase similar to the one recorded from a previous utterance into the microphone 2 and when the voice detector 7 outputs a signal, the spoken instruction transduced into a corresponding electric signal through the microphone 2 is amplified through the speech input interface 6, filtered and divided into voice power spectra across the frequency bands through the band pass filters 8, squared or rectified and further converted into corresponding digital time-series matrix-phonetic pattern data through the parameter extraction section 9, and then stored in the memory unit 10, in the same manner as in the recording mode.

Next, the time-series matrix-phonetic pattern data stored in the memory unit 10 during the recognition mode are sequentially compared in resemblance comparator 12 with the time-series matrix-phonetic pattern data stored in the reference pattern memory unit 11 during the recording mode. The resemblance comparator 12 calculates the correlation level of the speech instruction supplied to the reference speech instruction after time normalization and level normalization to compensate for variable speaking rate (because the same person might speak quickly and loudly at one time but slowly and in a whisper at some other time). The correlation factor is usually obtained by calculating the Tchebycheff distance (explained later) between recognition-mode time-series matrix-phonetic pattern data and recording-mode time-series matrix-phonetic pattern data. A signal having a value indicative of the correlation factor calculated by the resemblance comparator 12 is supplied to a resemblance determination section 13 to determine whether or not the calculated values lie within a predetermined range; thus section 13 evaluates the cross-correlation of the recording and recognition mode data. If the calculated value is within the range, a command signal, indicating that a recognition-mode spoken instruction having adequate resemblance to one of the recorded instruction phrases, is supplied to one of actuators 14 to open the vehicle doors, for instance. The above-mentioned operations are all executed in response to command signals derived from the controller 5.

Description has been made hereinabove of the case where the speech recognizer 100 comprises various discrete elements or sections; however, it is possible to embody the speech recognizer 100 with a microcomputer including a central processing unit, a read-only memory, a random-access memory, a clock oscillator, etc. In this case, the voice detector 7, the parameter extraction section 9, the memory 10, the reference pattern memory 11, the resemblance comparator 12 and the resemblance determination section 13 are all incorporated within the microcomputer, executing the same or similar processes, calculations and/or operations as explained hereinabove.

The digital time-series matrix-phonetic pattern data and the Tchebycheff distance are defined as follows for an exemplary situation:

In the case where there are four bandpass filters and each filter has 32 time-series increments, the digital recording-mode time-series matrix-phonetic pattern data can be expressed as

| $F(A) = f(i,j) =$ | $f(1,1), f(1,2), f(1,3) \ldots, f(1,32)$ |
| | $f(2,1), f(2,2), f(2,3) \ldots, f(2,32)$ |
| | $f(3,1), f(3,2), f(3,3) \ldots, f(3,32)$ |
| | $f(4,1), f(4,2), f(4,3) \ldots, f(4,32)$ | where A designates a first recording-mode speech instruction (reference) (e.g. OPEN DOORS), i denotes the filter idex, and j denotes time-series increment index.

If a first recognition-mode speech instruction (e.g. OPEN DOORS) is denoted by the character "B", the Tchebycheff distance can be obtained from the following expression:

$$l = |F(A) - F(B)| = \sum_{i=1}^{4} \sum_{j=1}^{32} |f_A(i,j) - f_B(i,j)|$$

FIG. 2 is a more detailed drawing of the speech detection section of the voice detecting means of the prior-art speech recognizer shown in FIG. 1; the voice detector of FIG. 2 is quite relevant to the present invention.

In the figure, a spoken phrase transducer by microphone 2 into a corresponding electric signal (100) first passes through the speech input interface 6. The interface 6 is mainly made up of a spectrum-normalizing amplifier which amplifies higher frequencies of the electric signal to a greater degree than lower frequencies. This is because speech sounds tend to be attenuated greatly in the higher frequency range. A typical waveform of the spoken instruction signal (200) including noise derived from the spectrum-normalizing amplifier 6 is shown in FIG. 3(A).

The amplified spoken instruction signal (200) is applied to the bandpass filters 8 to begin the process of recognizing whether the signal is a correctly spoken instruction; the signal is also coupled to the RMS smoother 15, comprising mainly a rectifier 15-1 and a smoother 15-2, to begin the process of detecting the start and end of the spoken phrase. An exemplary rectified and smoothed spoken instruction signal (400) is shown in FIG. 3(B), wherein $T_f$ denotes a constant reference threshold voltage level.

The smoothed signal (400) is coupled to the voice detector 7 including a voltage level comparator 7-1 and a pulse duration comparator 7-2. The voltage level comparator 7-1 compares the voltage level of the smoothed signal with the predetermined reference threshold voltage level $T_f$ and derives a H-voltage level pulse signal (600) only while the voltage level of the speech instruction signal exceeds the reference threshold level $T_f$, as depicted in FIG. 3(C).

The pulse duration comparator 7-2 compares the pulse width of the H-voltage level pulse signal (600) with a predetermined reference spoken instruction start time $t_s$ and the pulse width of the L-voltage level pulse signal (600) with anothr predetermined reference end time $t_e$ and derives a H-voltage level signal (700) only when the H-voltage level pulse width exceeds the reference start time $t_s$ and a L-voltage level signal (700) only when the L-voltage level pulse width exceeds the reference end time $t_s$.

Reference is made to FIGS. 3(C) and (D), wherein the pulse width of the first H-voltage level pulse signal $t_1$, is shorter than the reference start time $t_s$; this causes the pulse duration comparator 7-2 to derive no H-voltage level signal. On the other hand, if the pulse width of the second H-voltage level pulse signal is $t_2$, an interval longer than the reference start time $t_s$, the pulse duration comparator 7-2 derives a H-voltage level signal, indicating the start of a spoken instruction. In this case, the H-voltage level start signal (700) derived from the pulse duration comparator 7-2 is delayed by the reference start time $t_s$ after the actual start time $P_s$ of the spoken instruction. Thereafter, this H-voltage level start signal is generated until the duration comparator 7-2 detects the end of speech instruction.

Next, assume that the H-voltage level pulse signal $t_2$ changes to a L-voltage level for a period of time, $t_3$, which is shorter than the reference end time $t_e$, whereby the pulse duration comparator 7-2, does not derive a L-voltage level signal, that is, duration comparator 7-2 sustains the H-voltage level signal. Thereafter, even if a third pulse signal having a pulse width $t_4$ is derived again from the voltage level comparator 7-1, the operation of the duration comparator is not affected since the pulse duration comparator 7-2 is still deriving a H-voltage level signal.

Next, when the H-voltage level pulse signal $t_4$ changes to a L-voltage level for a period of time $t_5$ which is longer than the reference end time $t_e$, the pulse duration comparator 7-2 derives a L-voltage level signal, indicating the end of a speech instruction. In this case, the L-voltage level end signal from the duration comparator 7-2 is delayed by the reference end time $t_e$ after the actual end time $P_e$ of speech instruction. Thereafter, the end signal is sustained until the duration comparator 7-2 detects the start of another speech instruction.

In response to the H-voltage level signal from the duration comparator 7-2 as shown in FIG. 3(D), the controller 5 derives a command signal to activate a group of bandpass filters 8 and other sections to recognize the spoken instruction signal derived from the spectrum-normalizing amplifier 6, as already explained.

In the prior-art voice detecting means connected to the microphone as described above, the reference threshold level in the voltage level comparator 7-1 is fixed at a predetermined level in both the recording mode and the recognition mode. Thereby the speech recognizer cannot easily cope with noise level fluctuations within the passenger compartment. Further, the driver must utter a spoken instruction loudly even in recording mode, whereby there is a distortion tendency for the digital time-series matrix-pattern data of a spoken instruction uttered toward microphone 2, particularly during recording.

In view of the above description and with reference to the attached drawings, the embodiments of the voice detecting means of the speech recognition system for an automotive vehicle according to the present invention are described hereinbelow.

In brief summation of this first embodiment, the reference threshold level in the voltage level comparator in recording mode is predetermined to be lower than that in recognition mode. Therefore, the driver can reliably record a reference spoken instruction in a relatively low voice in recording mode.

Figure 4:
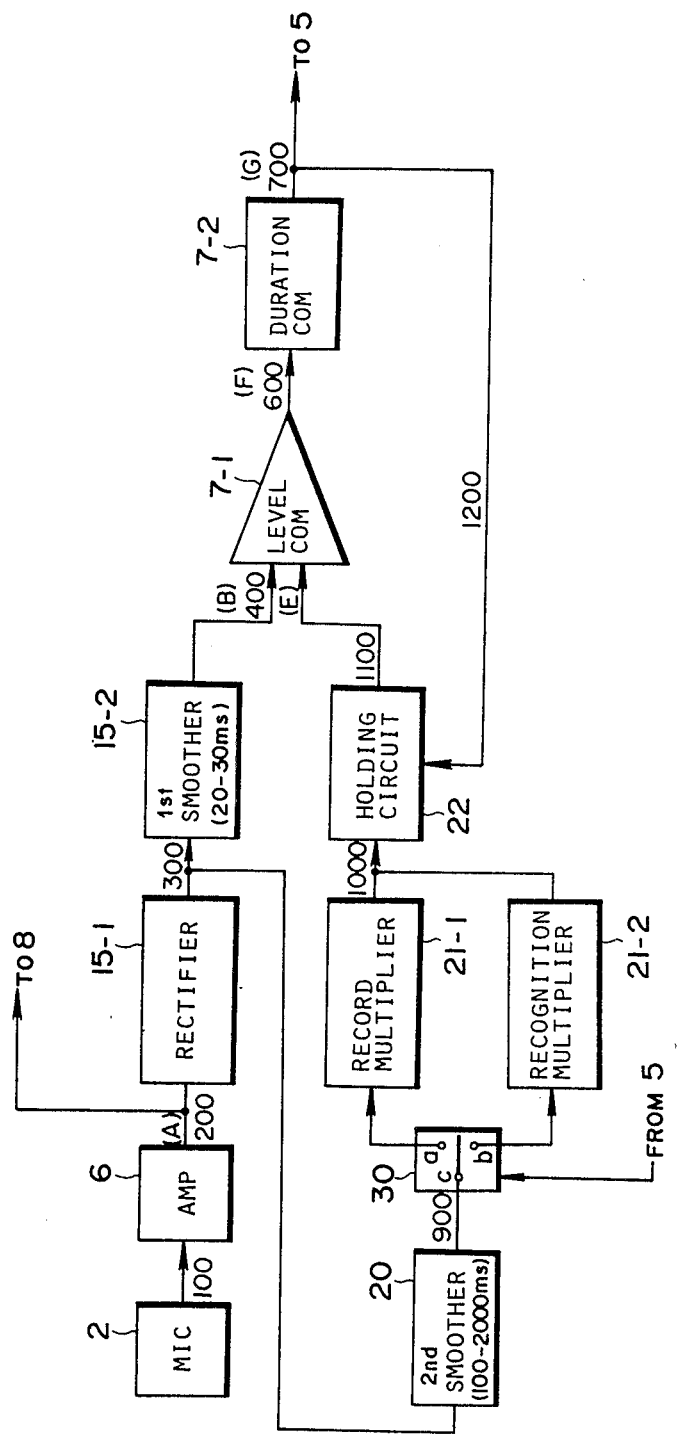
FIG. 4 is a schematic block diagram of an essential portion of a first embodiment of a voice detecting means of the speech recognition system for an automotive vehicle according to the present invention.

FIG. 4 is a block diagram of a first embodiment of a voice detecting means of the speech recognition system according to the present invention. The voice detecting means of FIG. 4 comprises a microphone 2, a spectrum normalizing amplifier 6, a rectifier 15-1, a first smoother 15-2 having a time constant of 20 to 30 ms, a voltage level comparator 7-1 and a pulse duration comparator 7-2 in the same way as in the prior-art voice detecting means of FIG. 2. Duration comparator 7-2 derives a pulse having leading and trailing edges respectively signifying the start and end of a spoken instruction. In addition to these sections, the voice detecting means of FIG. 2 comprises a second smoother 20 having a 100 to 2000 ms time constant, which is much longer than that of the first smoother 15-2, an analog switch 30 having a movable contact that engages fixed contact a in response to a recording-mode command signal from the controller 5 when the record switch 1 is depressed and engages fixed contact b in response to a recognition-mode command signal from the controller 5 when the recognition switch 3 is depressed. Contacts a and b are respectively connected to a record multiplier 21-1 and recognition multiplier 21-2. Multiplier 21-1 increases the voltage level of the smoothed signal (900) to an apropriate recording-mode voltage level and derives a multiplied signal (1000) corresponding thereto. Multiplier 21-2 increases the voltage level of the smoothed signal (900) to an appropriate recognition-mode voltage level and derives a multiplied signal (1000) corresponding thereto. Holding circuit 22 responds to duration comparator 7-2 and multipliers 21-1 and 21-2 to pass the multiplied signal (1000) from one of multipliers 21-1 or 21-2 so that output signal 1100 of circuit 22 is an unaltered replica of signal 1000; alternatively, circuit 22 derives signal 1100 as a constant level equal to the amplitude of signal 1000 at the time of a positive going leading edge transistion of signal 700 at the output of duration comparator 7-2.

Figure 5:
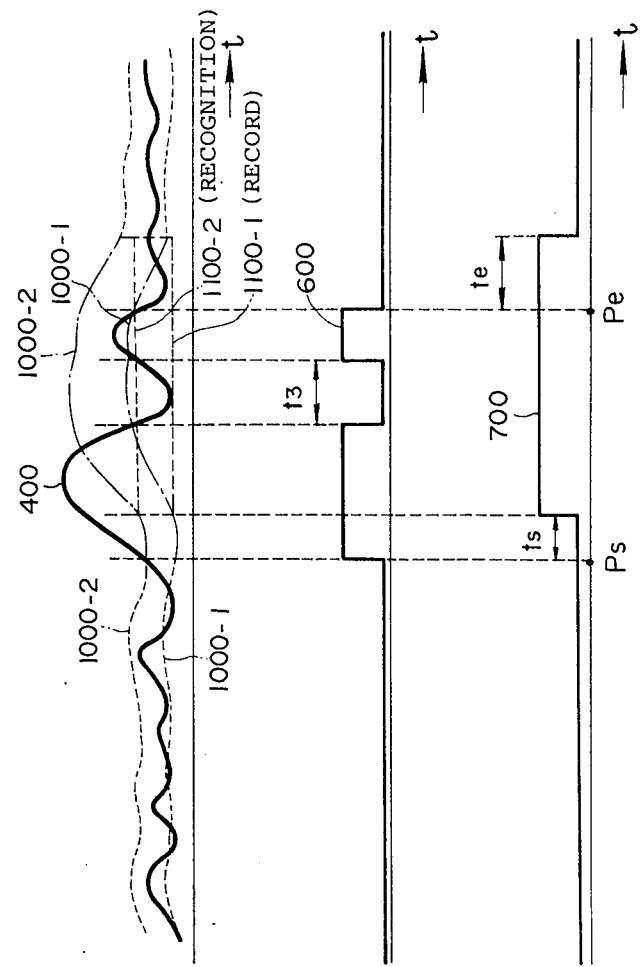
FIG. 5(A) is a graphical representation of the waveforms of a spoken instruction signal including noise as measured at points (B) and (E) in FIG. 4.
FIG. 5(B) is a graphical representation of the waveform of the spoken instruction pulse signal as measured at point (F) in FIG. 4.
FIG. 5(C) is a graphical representation of the waveform of the spoken instruction start/end signal as measured at point (G) in FIG. 4.

The operation of the embodiment illustrated in FIG. 4 is described with reference to FIGS. 5(A) to 5(C).

When a spoken instruction is uttered into microphone 2, the signal corresponding thereto is transduced into a signal (100) and amplified into another signal (200) by spectrum-normalizing amplifier 6. The amplifier signal (200) is then coupled to the bandpass filters 8 and the rectifier 15-1. The signal (300) rectified by the rectifier 15-1 is simultaneously applied to the first smoother 15-2 and the second smoother 20. The rectified signal (300) applied to the first smoother 15-2 is smoothed with a relatively short time constant circuit into a smoothed signal (400) and then supplied to one input terminal of the voltage level comparator 7-1. On the other hand, the rectified signal (300) applied to the second smoother 20 is smoothed with a relatively long time constant circuit into another smoothed signal (900).

Consider the system operation while it is set to the recording mode wherein controller 5 feeds a recording-mode command signal to the analog switch 30 to cause the movable contact c thereof to engage fixed contact a. Thereby, the recording-mode smoothed signal (900) is multiplied by the recording multiplier 21-1 into a higher level signal (1000-1) that is applied to the other input terminal of the voltage level comparator 7-1, via the holding circuit 22. Signal 1000-1 is not modified by circuit 22 and is derived from circuit 22 as a recording-mode start-detection threshold level signal (1100-1) for level comparator 7-1. On the other hand, when the system is set to the recognition mode, controller 5 supplies a recognition-mode command signal to the analog switch 30 so that the movable contact c thereof contacts fixed contact b. Thereby, the recognition-mode smoothed signal (900) is multiplied by the recognition multiplier 21-2 into another higher level signal (1000-2) that is applied to other input terminal of the voltage level comparator 7-1, via the holding circuit 22. Signal 1000-2 is not modified by circuit 22 and is derived from circuit 22 as a recognition-mode start-detection threshold level signal (1100-2) for level comparator. In this embodiment, it is preferable to determine the recognition-mode start-detection threshold level 1000-2 to be 1.5 to 2.0 times higher than the recording-mode start-detection threshold level 1000-1. In other words, it is preferable to set the multiplication rate of the recognition multiplier 21-2 to be 1.5 to 2.0 times greater than that of the record multiplier 21-1.

The start of the smoothed spoken instruction signal (400) is detected in the recognition mode as follows: When the voltage level of a rectified spoken instruction signal (300) increases, the relatively short time constant of the first smoother 15-2 causes the signal (400) derived from the first smoother 15-2 to increase immediately as depicted in FIG. 5(A). On the other hand, since the time constant of the second smoother 20 is fairly long, the output signal (900) of the second smoother 20 cannot initially increase abruptly. Therefore, the signal (1000) multiplied by the multiplier 21-2 or the signal (1100-2) passed through the holding circuit 22 is at a relatively low level as depicted in FIG. 5(A). (At this time holding circuit 22 has no effect on the output signals of multipliers 21-1 and 21-2 because no holding signal (1200) is being supplied to the holding circuit 22.) At time Ps in the FIG. 5(A) example, the voltage level of the signal (400) exceeds the threshold level (1000-2), causing comparator 7-1 to generate a H-voltage level pulse signal (600) as depicted in FIG. 5(B). The duration comparator 7-2 derives another H-voltage level pulse signal (700) when the H-voltage level pulse width of the signal (600) exceeds the reference start time ts, as depicted in FIG. 5(C). The positive going leading edge of pulse signal 700 provides a reliable indication of the start of a spoken instruction.

In contrast with this, the end of the spoken instruction signal (400) is detected in the recognition mode in response to the leading edge of the H-voltage level pulse signal (700), the noise level indication output of recognition multiplier 21-2 and the audio indicating output of smoother 15-2 as follows: The leading edge of the H-voltage level output signal (700) of pulse duration comparator 7-2 applied to the holding circuit 22 causes the holding circuit 22 to derive a constant level output 1100-2 equal to the level of signal (1000-2) derived from the multiplier 21-2 at reference start time ts. Circuit 22 maintains this constant level 1100-2 until the negative going trailing edge of the H-level pulse of signal 700 occurs at the end of the spoken instruction. As shown in FIGS. 5(A) and 5(B), when the spoken instruction smoothed signal (400) drops below level 1100-2 for a time period t3 that is shorter than the reference end time te, the pulse duration comparator 7-2 sustains the H-voltage level signal (700). Thereafter, when the spoken instruction is completed and the smoothed signal (400) drops below the constant reference end threshold level (1100-2) for more than the reference end time te, the end of the spoken instruction is indicated by the trailing, negative going edge of waveform (700) that is delayed by the reference end time te after the actual end time Pe, as depicted in FIG. 5(C). Pulse duration comparator 7-2 responds to the trailing edge of waveform (600) at time Pe and for the interval te thereafter to generate the trailing edge of waveform 700 to indicate the end of the spoken instruction. When the H-voltage level signal (700) changes to the L-voltage level, the holding action of circuit 22 is disabled whereby signal (1400) again becomes a replica of the multiplied signal (1000-2), as shown in FIG. 5(A).

Holding circuit 22 is provided because there can be simultaneous increases in the reference threshold level (1000-2) as indicated by the dotted and dashed lines in FIG. 5(A) and decreases in the smoothed signal (400) below the threshold level (1000-2) before the end of spoken instruction, resulting in an erroneous spoken instruction end detection. Since the time constant of the second smoother 20 is longer than that of the first smoother 1502, the reference threshold level (1000-2) increases gradually with a time delay as the smoothed spoken instruction signal (400) increases gradually; that is, the timing of the two signals (400, 1000-2) does not match.

The start and end of the spoken instruction signal (400) in the recording mode are detected in the same manner as in the recognition mode described above, except that the multiplication factor of multiplier 21-1 is less than that of multiplier 21-2.

Figure 6:
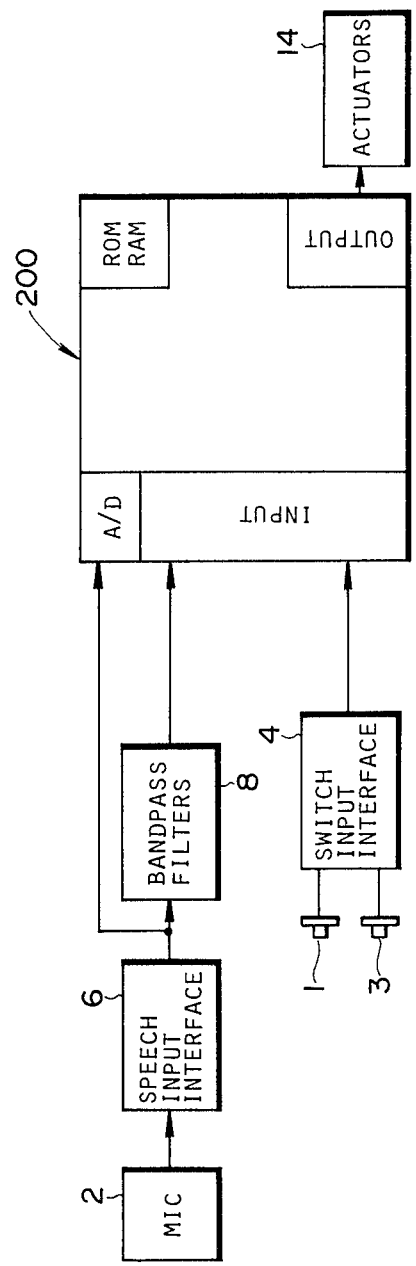
FIG. 6 is a schematic block diagram of a second embodiment of a voice detecting means of the speech recognition system for an automobile vehicle according to the present invention, in which a microcomputer is adopted for executing various processes, calculations and/or operations.

FIG. 6 is a block diagram of an embodiment of a voice detecting means of the speech recognition system according to the present invention. In this embodiment, the functions of the rectifier 15-1, the first smoother 15-2, the level comparator 7-1, the duration comparator 7-2, the second smoother 20, the analog switch 30, the record multiplier 21-1, the recognition multiplier 21-2, and the holding circuit 22 are all performed by a microcomputer 200, that is provided with an analog-to-digital converter, a central processing unit, a read-only memory, a random-access memory and input/output interfaces, etc. In this connection, the function of the smoother can be implemented through appropriate arithmetic operations (calculations of averages) in accordance with appropriate software. That is to say, some of the functions of the voice detecting means are implemented via arithmetic operations executed in accordance with appropriate software, in place of hardware.

Further, in this embodiment, various other functions are performed by microcomputer 200, such as the functions performed by parameter extraction section 9, the memory 10, the reference pattern memory 11, the resemblance comparator 12, the resemblance determination section 13, the controller 5, etc.

On the basis of digital signals representative of the spoken intstruction signal derived by the microphone 2, the microcomputer 200 detects the start and end of the spoken instruction in the same way as described already with reference to FIG. 4.

Figure 7:
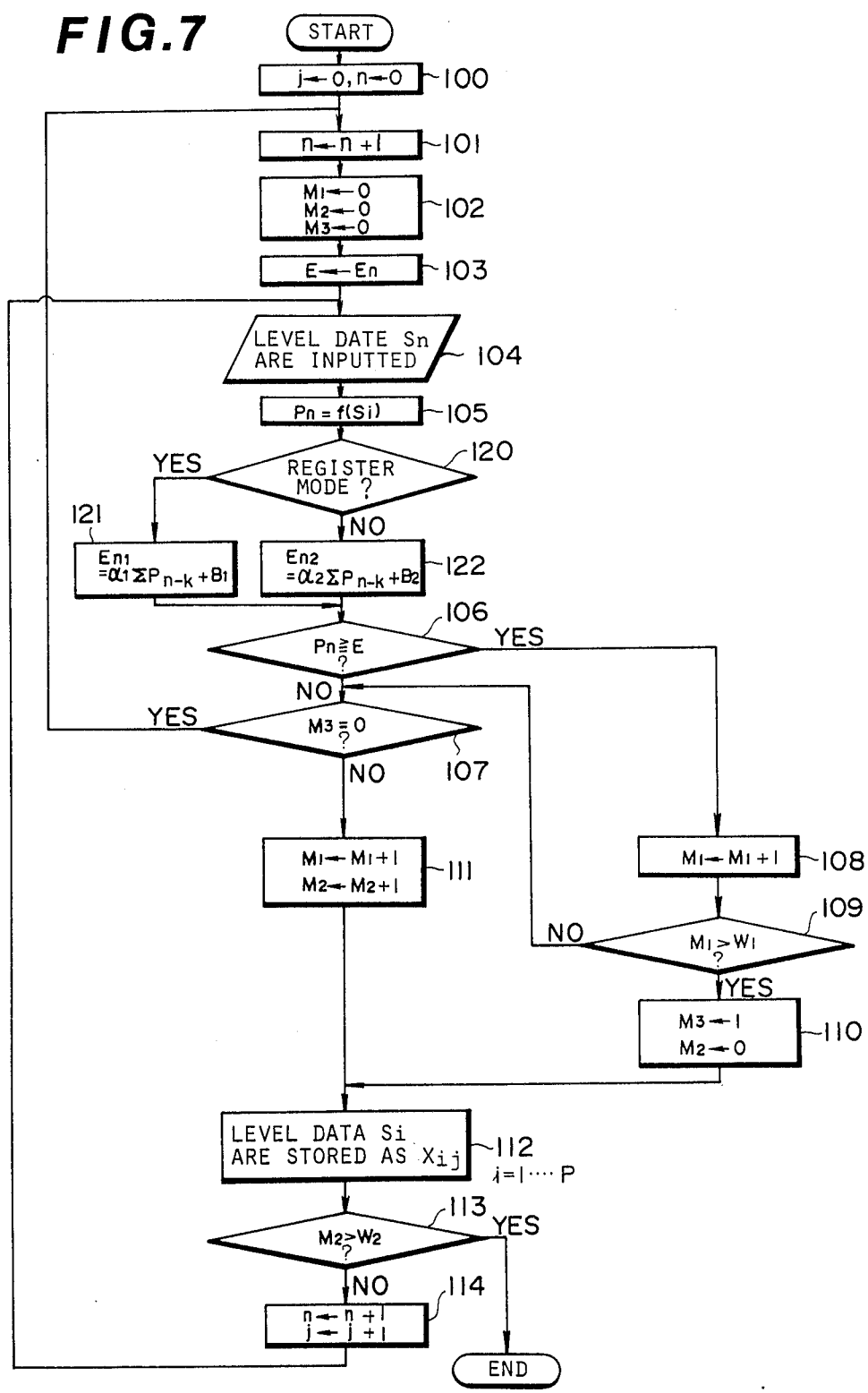
FIG. 7 is a flowchart of the method of detecting the start and end of a spoken instruction signal on the basis of recording-mode and recognition-mode reference threshold levels in accordance with a program stored in a microcomputer shown in FIG. 9.
Figure 8:
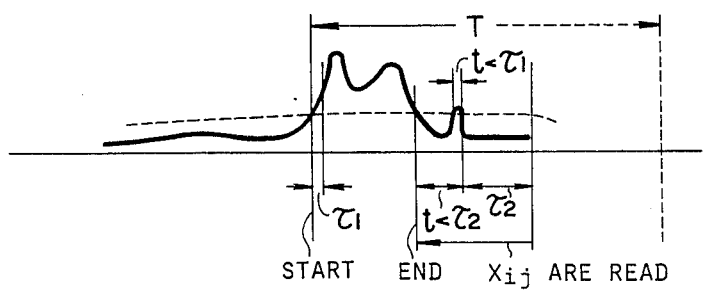
FIG. 8 is a graphical representation for assistance in explaining the method of detecting the start and end of a spoken instruction signal on the basis of arithmetic operations.

FIG. 7 is a flowchart of the processing steps of the digital signals derived from the A-D converter to obtain the spoken instruction start and end command signals; FIG. 8 is a time chart of an exemplary waveform of a spoken instruction signal.

The labels of FIG. 7 have the following definitions:

j: suffix indicative of address number n: suffix indicative of time

Sn: spoken instruction voltage level data sampled for each sampling time interval (referred to as sample voltage level data)

Pn: spoken instruction power level data obtained on the basis of the sample voltage level data Sn (referred to as sample power level data)

E: threshold voltage level obtained when spoken instruction start is detected (referred to as start threshold level)

En: threshold voltage level calculated while spoken instruction levels are being sampled (referred to as calculation threshold level)

$M_1$: number of sampling time intervals during each of which a sample power level data Pn exceeds the calculation threshold level En (referred to as start-detection sample number)

$M_2$: number of samling time intervals during each of which a sample power level data Pn drops below the calculation threshold level En (referred to as sampling-stop sample number)

$M_3$: start-detection code, if "1", spoken instruction start is detected, if "0", spoken instruction start is not yet detected.

$W_1$: reference number of sampling time intervals corresponding to a reference start time $\tau_1$ (FIG. 8) (referred to as reference start-decision sample number)

$W_2$: reference number of sampling time intervals corresponding to a reference stop time $\tau_2$ (referred to as reference sampling-stop sample number)

Xij: data stored in address No. j of the memory unit (referred to as stored data)

The program control first resets the address number suffix j and the time suffix n (in block 100) for incrementing the time suffix n in order (in block 101). Further, the program control initializes the numbers of start-detection sample number $M_1$, sampling-stop sample number $M_2$ and the start detection code $M_3$ (in block 102), and replaces the start threshold level E with the calculation threshold level En (in block 103). At any given time n, spoken instruction signal voltage level data Sn are supplied to the computer (in block 104). In response to these sample voltage level data Sn, the power Pn of a spoken instruction signal is calculated on the basis of, for instance, the following expression (in block 105):

$$Pn = \sum_{i}^{q} S_i W_i$$

where q denotes the number of filters and Wi denotes weighting coefficients (since noise within a passenger compartment usually has a peak value at about 200 Hz and a minimum gradient at more than 200 Hz, it is necessary to compensate the voltage level of a spoken instruction including noise so as to cancel the effect of noise).

Next, the program control checks to determine whether the system is in recording or recognition mode (in block 120). If the system is in a recording mode, the current calculation threshold level En is calculated on the basis of, for instance, the following expression (in block 121):

$$E_{n1} = \alpha_1 \sum_{i=1}^{p} P_{n-k} + \beta_1$$

If in recognition mode, the current calculation threshold En is calculated on the basis of, for instance, the following expression (in block 122):

$$E_{n2} = \alpha_2 \sum_{i=1}^{p} P_{n-k} + \beta_2$$

where En indicates the mean threshold level over the sampling time interval from 1 to p, where p is a fixed time period, and $\alpha_1$, $\alpha_2$ and $\beta_1$, $\beta_2$ denote constants. Here, the above-mentioned four constants are predetermined in such a way that $\alpha_1$ is smaller than $\alpha_2$ and $\beta_1$ is also smaller than $\beta_2$, with the result that the recording mode threshold voltage level $E_{n1}$ is lower than level $E_{n2}$. As already described with reference to FIG. 4, it is desirable to set the ratio of $E_{n2}$ to $E_{n1}$ to be within a range from 1.5 to 2.0. Further, in the above expression, the threshold level En is calculated on the basis of the sample power level data; however, it is of course possible to directly and simply obtain the threshold level En on the basis of signal voltage level data Sn, without calculating current signal data. Next, the calculated sample power levels Pn are consecutively compared with the calculated threshold level En (in block 106). If Pn is below En (in block 106), the start detection code is set to "0" (in block 107). Since derivation of a "0" in operation 107 indicates that the sampled signal level is lower than the calculated threshold level and that the start has not yet been detected, the program returns to block 104 and repeats the same operations from block 104 to block 107. Thereafter, if Pn exceeds En, to indicate that the sampled signal level is higher than the calculated threshold level, the start-detection sample number $M_1$ is incremented (in block 108). Next, $M_1$ is compared with the reference start-detection sample number $W_1$ corresponding to a reference start time $\tau_1$ (reference start time ts shown in FIGS. 5) (in block 109). For instance, if the sampling time interval is 9 ms and the time $\tau_1$ is 72 ms, $W_1$ is 8. If $M_1$ is greater than $W_1$ (in block 109), to indicate that the sampled spoken instruction level data value Pn exceeds the calculated threshold level En for more than the reference start time $\tau_1$, the start-detection code $M_3$ is set to "1" indicating that the start detection is completed and at the same time the sampling-stop sample number $M_2$ is reset (described later) (in block 110). From this moment, the sample power level data Pn are sequentially stored in the memory as stored power level Xij (in block 112). If $M_1$ is below $W_1$ (in block 109), to indicate that the sampled spoken instruction power level data Pn exceeds the calculated threshold level En for less than the reference start time $\tau_1$ because of, for instance, noise, the program returns to block 107. In this state, of course, the start detection code $M_3$ is still "0", and the program is repeated beginning from block 104.

Further, once the start-detection sample number $M_1$ exceeds the reference start-detection sample number $W_1$ (in block 109) the start-detection code $M_3$ is set to "1" (in block 110), even if the sampled power level data Pn drops below the calculation threshold level En (in block 106) after the start has been detected; since $M_3$ is already "1" (in block 107) the sample power level data Pn are stored sequentially in the memory (in block 112).

Further, when the start-detection code $M_3$ is "1" (in block 107), the start-detection sample number $M_1$ and the sampling-stop sample number $M_2$ are both incremented (in block 111).

Thereafter, as $M_2$ increments, $M_2$ is compared with the reference sampling stop sample number $W_2$ corresponding to a time $\tau_2$ (for instance 40) (in block 113). If $M_2$ exceeds $W_2$, the program stops storing the data in the memory because Pn drops below En for more than a reference stop time $\tau_2$, and the program control stops. If $M_2$ is below $W_2$ to indicate that Pn has not yet dropped below En for more than $\tau_2$, n and j are both incremented (in block 114), and the program then returns to block 104.

FIG. 8 is an example of the case where the power level data Pn exceeds the threshold level En for more than time $\tau_1$, and drops below the threshold level En for more than time $\tau_2$; reference to FIG. 8 provides assistance in understanding the flowchart shown in FIG. 7.

As described above, in the voice detecting means of the speech recognition system for an automotive vehicle according to the present invention, since the reference threshold voltage level in the recording mode is determined to be lower by 0.5 to 0.7 times that in the recognition mode, even if the driver utters a spoken instruction in a low voice as is usual when the vehicle is parked in a quiet place, it is possible to reliably record the instruction in the system. On the other hand, even if the driver utters a spoken instruction in a loud voice as is usual when noise within the passenger compartment is intense as when the vehicle is running on a noisy city street, it is possible to reliably supply the instruction to the system.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. A speech recognition system for activating an automotive vehicle actuator in response to a command spoken instruction signal coupled through and transduced by a microphone while the system is responsive to a recognition-mode command signal, the system responding to the instruction to determine the extent to which the instruction resembles a reference spoken instruction signal previously coupled to the system through the microphone while the system was responsive to a recording-mode command signal, which comprises:
    (a) first means for smoothing the spoken instruction signal coupled through the microphone;
    (b) second means for smoothing the spoken instruction signal coupled through the microphone, said second smoothing means having a time constant longer than that of said first smoothing means;
    (c) means for switching a smoothed spoken instruction signal derived by said second smoothing means to first and second terminals while the system is respectively activated to the recording and recognition modes in response to the recognition-mode and recording-mode command signals;
    (d) first means connected to said first terminal for multiplying the level of the spoken instruction signal smoothed by said second smoothing means while the system is in the recording mode and for deriving a recording-mode threshold level signal corresponding thereto;
    (e) second means connected to said second terminal for multiplying the level of the spoken instruction signal smoothed by said second smoothing means while the system is in the recognition mode for deriving a recognition-mode threshold level signal corresponding thereto, the multiplication rate of said second multiplying means being higher than that of said first multiplying means;
    (f) means for comparing the smoothed spoken instruction signal level derived by said first smoothing means with (i) the recording-mode threshold level signal derived from said first voltage level multiplying means while the system is in the recording mode and (ii) the recognition-mode threshold level signal derived from said second voltage level multiplying means while the system is in the recognition mode and for deriving (i) a spoken instruction start command signal when the smoothed spoken instruction signal level derived by said first smoothing means exceeds one of the recording-mode and recognition-mode threshold levels for more than a reference start time and (ii) a spoken instruction end command signal when the smoothed spoken instruction signal level derived by said first smoothing means drops below one of the recording-mode and recognition-mode threshold levels for more than a reference end time; and
    (g) a speech recognizer for starting recognition of the spoken instruction signal coupled through the microphone in response to the start command signal and stopping recognition of the same signal in response to the end command signal.

2. A speech recognition system for activating an automotive vehicle actuator in response to a command spoken instruction signal coupled through and transduced by a microphone while the system is responsive to a recognition-mode command signal, the system responding to the instruction to determine the extent to which the instruction resembles a reference spoken instruction signal previously coupled to the system through the microphone while the system was responsive to a recording-mode command signal, which comprises:
    (a) a spectrum normalizing amplifer connected to said microphone for amplifying and spectrum-normalizing the spoken instruction signal transduced by the microphone;
    (b) a rectifier connected to said spectrum normalizing amplifier for rectifying the amplified spoken instruction signal;
    (c) a first smoother connected to said rectifier for smoothing the rectified spoken instruction signal and deriving a first smoothed signal;
    (d) a second smoother connected to said rectifier for smoothing the rectified spoken instruction signal with a time constant longer than that of said first smoother and deriving a second smoothed signal;
    (e) an analog switch having a movable contact connected to said second smoother, the movable contact contacting a first fixed contact in response to the recording-mode command signal and to a second fixed contact in response to the recognition-mode command signal;
    (f) a record multiplier connected to the first fixed contact of said analog switch for multiplying the second smoothed spoken instruction signal while the recording mode instruction command signal is derived and for deriving the recording-mode threshold level signal;

(g) a recognition multiplier connected to the second fixed contact of said analog switch for multiplying the second smoothed spoken instruction signal while the recognition mode instruction command signal is derived and for deriving the recognition-mode threshold level signal, the multiplication rate of said recognition multiplier being greater than that of said record multiplier;

(h) a holding circuit connected to said record and recognition multipliers for (i) passing the multiplied spoken instruction signal as a reference start threshold level when no holding signal is applied thereto and (ii) holding the multiplied spoken instruction signal as a constant end threshold level when the holding signal is applied thereto and for deriving the held signal thereafter until no holding signal is applied thereto;

(i) a level comparator having first and second input terminals respectively connected to said first smoother and to said holding circuit for comparing (i) the first smoothed spoken instruction signal with the reference start threshold level when no holding signal is applied to said holding circuit, and (ii) the first smoothed spoken instruction signal with the reference end threshold level when the holding signal is applied to said holding circuit, said comparator deriving a signal respectively having H and L levels when the amplitude of the signal at the first terminal is greater than the amplitude of the signal at the second terminal and vice versa, in each of the recording mode and recognition mode;

(j) a duration comparator connected to said level comparator and said holding circuit for comparing the pulse width of the H-voltage level signal with a reference start time and for deriving a spoken instruction start command signal when the H-voltage level pulse width exceeds the reference start time and for comparing the pulse width of the L-voltage level signal with a reference end time and for deriving a spoken instruction end command signal when the L-voltage level pulse width exceeds the reference end time, the H-voltage level signal from said duration comparator being applied to said holding circuit as the holding signal; and (k) a speech recognizer connected to said duration comparator for starting recognition of the spoken instruction signal coupled through the microphone in response to the start command signal and stopping recognition of the same signal in response to the end command signal.

3. A speech recognition system for an automatic vehicle as set forth in either claim 1 or 2, wherein the ratio of multiplication rate in recognition mode to that in recording mode is from 1.5 to 2.0.

4. A speech recognition system for activating an automotive vehicle actuator in response to a command spoken instruction signal coupled through and transduced by a microphone while the system is responsive to a recognition-mode command signal, the system responding to the instruction to determine the extent to which the instruction resembles a reference spoken instruction signal previously coupled to the system through the microphone while the system was responsive to a recording-mode command signal, which comprises:

(a) a record switch for deriving a recording-mode command signal when closed;

(b) a recognition switch for deriving a recognition-mode command signal when closed; and (c) a microcomputer connected to said record switch and said recognition switch for:

(1) deriving a spoken instruction and sampling spoken instruction signal level data Sn for each of plural sampling time intervals, (2) calculating the power Pn of a spoken instruction signal as a first function of the sampled signal level data Sn, (3) determining whether the system is in recording mode or in recognition mode in response to the value of at least one of the recording-mode command signal and the recognition-mode command signal, (4) calculating a recording-mode reference threshold level $E_{n1}$ as a second function of the calculated sample power level data Pn when the microcomputer determines that the system is in the recording-mode, (5) calculating a recognition-mode reference threshold level $E_{n2}$ as a third function of the calculated sample power level data Pn when the microcomputer determines that the system is in the recognition mode, levels $E_{n1}$ and $E_{n2}$ being calculated in such a way that $E_{n2}$ is higher than $E_{n1}$, (6) comparing the sample power level data Pn with the calculated start reference threshold voltage level En, (7) counting the number $M_1$ of sample power level data Pn exceeding the reference threshold voltage level En while a sampled sample power level data Pn exceeds the calculated start reference threshold voltage level En, (8) comparing the counted number $M_1$ with a reference start number $W_1$, (9) deriving a spoken instruction start command signal $M_3$ and storing the sampled signal power level data Pn in a memory sequentially, while the counted number $M_1$ exceeds the reference start number $W_1$,

(10) sampling the spoken instruction signal power level data Pn again while the counted number $M_1$ does not exceed the reference start number $W_1$,

(11) counting the number $M_2$ of the sample power level data Pn dropping below the threshold level En while the sample power level data Pn is less than the calculated start threshold level En,

(12) comparing the counted number $M_2$ with a reference end number $W_2$,

(13) deriving a spoken instruction end command signal and storing the sample power level data Pn in a memory sequentially while the counted number $M_1$ exceeds the reference end number $W_2$,

(14) sampling the spoken instruction signal power level data Pn while the counted number $M_2$ does not exceed the reference end number $W_2$, and

(15) starting recognition of the spoken instruction signal coupled through the microphone in response to the start command signal and stopping recognition of the same signal in response to the end command signal.

5. A method of detecting the start and end of a spoken instruction coupled through a microphone to a speech recognition system capable of operating in a recognition mode and in a recording mode, the system previously being responsive to a spoken instruction coupled to it while comprising the steps of:

(a) sampling spoken instruction signal level data Sn during each of plural sampling time intervals;

(b) calculating the power Pn of a spoken instruction signal as a first function of the sampled signal voltage level data Sn;

(c) determining whether the system is in recording mode or in recognition mode;

(d) calculating a recording-mode reference threshold level $E_{n1}$ as a second function of the calculated sample power level data Pn while the system is determined to be in the recording-mode;

(e) calculating a recognition-mode reference threshold level $E_{n2}$ as a third function of the calculated sample power level data Pn while the system is determined to be in the recognition-mode, the second and third functions having constants causing the calculated recording-mode reference threshold level to be lower than the calculated recognition-mode reference threshold level;

(f) comparing the sampled power level data Pn with the calculated start reference threshold voltage levels En;

(g) counting the number $M_1$ of power level data Pn exceeding the threshold level En while the sample power level data Pn exceeds the calculated start reference threshold level En;

(h) comparing the counted number $M_1$ with a reference start number $W_1$;

(i) deriving a spoken instruction start command signal $M_3$ and storing the sampled power level data Pn in a memory sequentially while the counted number $M_1$ exceeds the reference start number $W_1$;

(j) returning to step (a) above in response to the counted number $M_1$ not exceeding the reference start number $W_1$ in step (i);

(k) counting the number $M_2$ of power level data Pn dropping below the threshold level En while the sample power level data Pn drops below the calculated end reference threshold voltage level En;

(l) comparing the counted number $M_2$ with a reference end number $W_2$;

(m) deriving a spoken instruction end command signal and storing the sample power level data Pn in a memory sequentially while the counted number $M_2$ exceeds the reference end number $W_2$; and (n) returning to step (k) in response to the counted number $M_2$ not exceeding the reference end number $W_2$ in step (m).

6. The detecting method of claim 5, wherein the first function for calculating the power level data Pn of a spoken instruction signal is $$Pn = \sum_{i}^{q} \cdot S_i W_i$$

where q denotes the number of bandpass filters for analyzing the sampled spoken instruction signal level data Sn, and Wi denotes weighting coeffecients for each of said filters.

7. The detecting method of claim 5, wherein the second function for calculating the recording-mode reference threshold level is $$E_{n1} = \alpha_1 \sum_{i=1}^{p} P_{n-k} + \beta_1$$

and the third function for calculating the recognition-mode reference threshold level is $$E_{n2} = \alpha_2 \sum_{i=1}^{p} P_{n-k} + \beta_2$$

where p denotes the time period of the sampling time intervals and $\alpha_1$, $\alpha_2$ and $\beta_1$, $\beta_2$ denote constants determined in such a way that $\alpha_1$ is smaller than $\alpha_2$, and $\beta_1$ is smaller than $\beta_2$.

8. A speech recognition system capable of operating in environments having different background noise levels such that during a record operating mode the noise level has a tendency to be considerably lower than during a recognition operating mode, the system comprising means for establishing the record and recognition operating modes, means for deriving first and second signals respectively representing power in two different low pass spectra as derived in response to speech uttered for recognition and recording by the system in the presence of background noise in the environment where the utterance occurs, the first signal including frequency components higher than those of the second signal, means for changing the relative values of the first and second signals, signal amplitude comparison means, means coupled to the establishing means, the deriving means, the changing means and the comparison means for activating the comparison means so it derives: (a) a first signal level indicating that an utterance is occurring when (i) a first function of the magnitude associated with the first signal exceeds the magnitude of the second signal for more than a predetermined interval while the system is in the record operating mode, and (ii) a second function of the magnitude associated with the first signal exceeds the magnitude of the second signal for more than the predetermined interval while the system is in the recognition operation mode, (b) a second signal level indicating that an utterance is no longer occurring when (i) the first function of the magnitude associated with the first signal is less than the magnitude of the second signal for a set interval while the system is in the recording operating mode, and (ii) the second function of the magnitude associated with the first signal is less than the magnitude of the second signal for the set interval while the system is in the recognition operating mode, the first and second functions being respectively of the form $$f_1 = \alpha_1 P + \beta_1$$

$$f_2 = \alpha_2 P + \beta_2$$

where
$f_1$ = the first function
$f_2$ = the second function
$\alpha_1$ = a first predetermined, non-zero constant
$\alpha_2$ = a second predetermined, non-zero constant
$\alpha_1 > \alpha_2$
P = a function of the power spectrum of the utterance and the background noise, $\beta_1$ = a third predetermined constant that may be zero $\beta_2$ = a fourth predetermined constant that may be zero $\beta_1 > \beta_2$ unless $\beta_1 = \beta_2 = 0$, means for recording signals representing tonal characteristics of the utterance while the first signal level is derived and while the system is in the record operating mode, so that several different tonal characteristics representing signals are recorded for several different utterances, and means for comparing signals representing tonal characteristics of the utterance with the recorded tonal characteristics for the several different utterances while the first signal level is derived and while in the recognition operating mode, the tonal recording and tonal comparing means being disabled while the second signal level is derived.

9. The system of claim 8 wherein the first and second signal deriving means includes a microphone responsive to the utterance and the background noise for deriving a replica of the utterance and the background noise, means responsive to the replica for deriving an additional signal representing single polarity variations of the replica, means responsive to the additional signal for deriving the first and second signals, the first and second signals being first and second smoothing functions of the additional signal such that the first smoothing function has a time constant much less than the second smoothing function.

10. The system of claim 9 wherein the activating means includes a signal holding means, the signal holding means being coupled to the another signal deriving means, the comparison means and the means for deriving first and second signals for maintaining a first input to the comparison means responsive to the second signal at a constant value while the first signal level is derived, the constant value being the amplitude of the second signal when the speech utterance begins.

11. The system of claim 9 wherein the activating means includes a signal holding means, the signal holding means being coupled to the another signal deriving means, the comparison means and the means for deriving first and second signals for maintaining a first input to the comparison means responsive to the second signal at a constant value while the first signal level is derived and for causing said first input to be a replica of the second signal while the another signal indicates that the speech utterance is not occurring.

12. The system of claim 8 wherein the activating means includes a signal holding means, the signal holding means being coupled to the another signal deriving means, the comparison means and the means for deriving first and second signals for maintaining a first input to the comparison means responsive to the second signal at a constant value while the first signal level is derived, the constant value being the amplitude of the second signal when the speech utterance begins.

13. The system of claim 8 wherein the activating means includes a signal holding means, the signal holding means being coupled to the another signal deriving means, the comparison means and the means for deriving first and second signals for maintaining a first input to the comparison means responsive to the second signal at a constant value while the first signal level is derived and for causing said first input to be a replica of the second signal while the another signal indicates that the speech utterance is not occurring.

14. A speech recognition system capable of operating in environments having different background noise levels, the system comprising means for establishing record and recognition operating modes, means for deriving first and second signals respectively representing power in two different low pass spectra as derived in response to speech uttered for recognition and recording by the system in the presence of background noise in the environment where the utterance occurs, the first signal including frequency components higher than those of the second signal, signal amplitude comparison means, means coupled to the establishing means, the deriving means, and the comparison means for activating the comparison means so it derives: (a) a first signal level indicating that an utterance is occurring when a function of the magnitude associated with the first signal exceeds the magnitude of the second signal for more than a predetermined interval while the system is in the record and recognition operating modes, and (b) a second signal level indicating that an utterance is no longer occurring when the function of the magnitude associated with the first signal is less than the magnitude of the second signal for a set interval while the system is in the recording and recognition modes, the function f, being of the form $$f = \alpha P + \beta$$

where $\alpha$ = a first predetermined non-zero constant $\beta$ = a second predetermined constant that may be zero P = a function of the power spectrum of the utterance and the background noise such that P is a replica of the utterance and background noise power spectrum while the second signal level is derived, P being a constant value commensurate with the power spectrum of the utterance and background noise at the time the first signal level is initially derived, the constant value of P being derived throughout the interval of the first signal level;

means for recording signals representing a voice power spectrum of the utterance while the first signal level is derived and while the system is in the record operating mode so that several different tonal characteristics representing signals are recorded for several different utterances, and means for comparing signals representing voice power spectrum of the utterance with the recorded voice power spectrum for the several different utterances while the first signal level is derived and while the system is in the recognition operating mode, the voice power spectrum recording and voice power spectrum comparing means being disabled while the second signal level is derived.

15. The system of claim 14 wherein the first and second signal deriving means includes a microphone responsive to the utterance and the background noise for deriving a replica of the utterance and the background noise, means responsive to the replica for deriving an additional signal representing single polarity variations of the replica, means repsonsive to the additional signal for deriving the first and second signals, the first and second signals being first and second smoothed functions of the additional signal such that the first smoothed function has a time constant much less than the second smoothed function.

16. A speech recognition method that is performed by a system in environments having different background noise levels such that during a record operating mode the noise level has a tendency to be considerably lower than during a recognition operating mode, the method comprising: establishing the record and recognition operating modes in the system, deriving first and second signals respectively representing power in two different low pass spectra as derived in response to speech uttered for recognition and recording by the system in the presence of background noise in the environment where the utterance is occurring, deriving a first signal level indicating that an utterance is occurring when (i) a first function of the magnitude associated with the first signal exceeds the magnitude of the second signal for more than a predetermined interval while the system is in the record operating mode, and (ii) a second function of the magnitude associated with the first signal exceeds the magnitude of the second signal for more than the predetermined interval while the system is in the recognition operation mode, deriving a second signal level indicating that an utterance is no longer occurring when (i) the first function of the magnitude associated with the first signal is less than the magnitude of the second signal for a set interval while the system is in the recording operating mode, and (ii) the second function of the magnitude associated with the first signal is less than the magnitude of the second signal for the set interval while the system is in the recognition operating mode, the first and second functions being respectively of the form $$f_1 = \alpha_1 P + \beta_1$$

$$f_2 = \alpha_2 P + \beta_2$$

where
$f_1$ = the first function
$f_2$ = the second function
$\alpha_1$ = a first predetermined, non-zero constant
$\alpha_2$ = a second predetermine, non-zero constant
$\alpha_1 > \alpha_2$
P = a function of the power spectrum of the utterance and the background noise,
$\beta_1$ = a third predetermined constant that may be zero
$\beta_2$ = a fourth predetermined constant that may be zero
$\beta_1 > \beta_2$ unless $\beta_1 = \beta_2 = 0$, recording signals representing tonal characteristics of the utterance while the first signal level is derived and while the system is in the record operating mode, so that several different tonal characteristics representing signals are recorded for several different utterances, comparing signals representing tonal characteristics of the utterance with the recorded tonal characteristics for the several different utterances while the first signal level is derived and while the system is in the recognition operating mode, the tonal recording and comparing steps being disabled while the second signal level is derived.

17. The method of claim 16 wherein P is a replica of the utterance and background noise power spectrum while the second signal level is derived, and P is a constant value commensurate with the power spectrum of the utterance and background noise at the time the first signal level is initially derived, the constant value of P being derived throughout the interval of the first signal level.

18. A speech recognition method that is performed by a system in environments having different background noise levels, the method comprising:

establishing record and recognition operating modes in the system, deriving first and second signals respectively representing power in two different low pass spectra as derived in response to speech uttered for recognition and recording by the system in the presence of background noise in the environment where the utterance is occurring, deriving a first signal level indicating that an utterance is occurring when a function of the magnitude associated with the first signal exceeds the magnitude of the second signal for more than a predetermined interval while the system is in the record and recognition operating modes, deriving a second signal level indicating that an utterance is no longer occurring when the function of the magnitude associated with the first signal is less than the magnitude of the second signal for a set interval while the system is in the recording and recognition operating modes, the function f being of the form $$f = \alpha P + \beta$$

where
$\alpha$ = a first predetermined non-zero constant
$\beta$ = a second predetermined constant that may be zero
P = a function of the power spectrum of the utterance and the background noise such that P is a replica of the utterance and background noise power spectrum while the second signal level is derived, and P is a constant value commensurate with the power spectrum of the utterance and background noise at the time the first signal level is initially derived, the constant value of P being derived throughout the interval of the first signal level, recording signals representing a voice power spectrum of the utterance while the first signal level is derived and while the system is in the record operating mode so that several different voice power spectrum representing signals are recorded for several different utterances, and comparing signals representing a voice power spectrum of the utterance with the recorded voice power spectrum for the several different utterances while the first signal level is derived and while the system is in the recognition operating mode, the voice power spectrum recording and voice power spectrum comparing steps being disabled while the second signal level is derived.

19. A speech recognition system capable of operating in environments having different background noise levels, the system previously having recorded therein signals representing a voice power spectrum of speech utterances to be recognized thereby, the system comprising means for deriving first and second signals respectively representing power in two different low pass spectra as derived in response to speech uttered for recognition by the system in the presence of background noise in the environment where the utterance occurs, the first signal including frequency components higher than those of the second signal, signal amplitude comparison means, means coupled to the deriving means and the comparison means for activating the comparison means so it:

derives (a) a first signal level indicating that an utterance is occurring when a function of the magnitude associated with the first signalo exceeds the magnitude of the second signal for more than a predetermined interval and (b) a second signal level indicating that an utterance is no longer occurring when the function of the magnitude associated with the first signal is less than the magnitude of the second signal for a set interval, the function f, being of the form $$f = \alpha P + \beta$$

where
$\alpha$ = a first predetermined non-zero constant
$\beta$ = a second predetermined constant that may be zero
P = a function of the power spectrum of the utterance and the background noise such that P is a replica of the utterance and background noise power spectrum while the second signal level is derived, P being a constant value commensurate with the power spectrum of the utterance and background noise at the time the first signal is initially derived, the constant value of P being derived throughout the interval of the first signal level;

means for comparing signals representing the voice power spectrum of the utterance with the recorded voice power spectrum for the several different utterances while the first signal level is derived; and means for disabling the voice power spectrum comparing means while the second signal level is derived.

20. A speech recognition method that is performed by a system in environments having different background noise levels, the system previously having recorded therein signals representing a voice power spectrum of speech utterances to be recognized thereby, the method comprising:

deriving first and second signals respectively representing power in two different low pass spectra as derived in response to speech uttered for recognition by the system in the presence of background noise in the environment where the utterance is occurring;

deriving a first signal level indicating that an utterance is occurring when a function of the magnitude associated with the first signal exceeds the magnitude of the second signal for more than a predetermined interval, deriving a second signal level indicating that an utterance is no longer occurring when the function of the magnitude associated with the first signal is less than the magnitude of the second signal for a set interval, the function f being of the form $$f = \alpha P + \beta$$

where
$\alpha$ = a first predetermined non-zero constant
$\beta$ = a second predetermined constant that may be zero
P = a function of the power spectrum of the utterance and the background noise such that P is a replica of the utterance and background noise power spectrum while the second signal level is derived, and P is a constant value commensurate with the power spectrum of the utterance and background noise at the time the first signal level is initially derived, the constant value of P being derived throughout the interval of th first signal level, and comparing signals representing the voice power spectrum of the utterance with signals representing the recorded voice power spectrum for the several different utterances while the first signal level is derived, the voice power spectrum comprising step being disabled while the second signal level is derived.

* * * * *